United States Patent
Bowler et al.

(10) Patent No.: US 12,143,758 B2
(45) Date of Patent: Nov. 12, 2024

(54) SIGNAL SENSITIVITY FOR AN OPTICAL LINE TERMINAL

(71) Applicant: ARRIS Enterprises LLC, Horsham, PA (US)

(72) Inventors: David Bowler, Stow, MA (US); Clarke V. Greene, Middletown, CT (US); Xinfa Ma, Acton, MA (US); Shaoting Gu, Acton, MA (US); Michael R. Morisseau, Lowell, MA (US); Samuel D. Francois, Lowell, MA (US)

(73) Assignee: ARRIS Enterprises LLC, Horsham, PA (US)

( * ) Notice: Subject to any disclaimer, the term of this patent is extended or adjusted under 35 U.S.C. 154(b) by 0 days.

(21) Appl. No.: 18/294,521

(22) PCT Filed: Apr. 26, 2023

(86) PCT No.: PCT/US2023/020069
§ 371 (c)(1),
(2) Date: Feb. 1, 2024

(87) PCT Pub. No.: WO2023/215157
PCT Pub. Date: Nov. 9, 2023

(65) Prior Publication Data
US 2024/0276129 A1    Aug. 15, 2024

Related U.S. Application Data

(60) Provisional application No. 63/338,697, filed on May 5, 2022.

(51) Int. Cl.
*H04Q 11/00*    (2006.01)
*H04B 10/27*    (2013.01)

(52) U.S. Cl.
CPC ......... *H04Q 11/0067* (2013.01); *H04B 10/27* (2013.01); *H04Q 2011/0088* (2013.01)

(58) Field of Classification Search
CPC ........ H04Q 11/0067; H04Q 2011/0088; H04B 10/27
USPC ........................................................... 398/66
See application file for complete search history.

(56) References Cited

U.S. PATENT DOCUMENTS

| 7,406,267 | B2 | 7/2008 | Mahgerefteh et al. |
| 9,294,192 | B2 * | 3/2016 | Eiselt ..................... H04J 14/02 |
| 2012/0121265 | A1 * | 5/2012 | Suvakovic ........... H04B 10/272 |
| | | | 398/66 |
| 2014/0212139 | A1 * | 7/2014 | Murata ............... H04L 12/2869 |
| | | | 398/66 |
| 2021/0266009 | A1 | 8/2021 | Ishii |

(Continued)

OTHER PUBLICATIONS

International Search Report and Written Opinion RE: Application No. PCT/US2023/020069, dated Aug. 11, 2023.

(Continued)

*Primary Examiner* — Dalzid E Singh
(74) *Attorney, Agent, or Firm* — Chernoff, Vilhauer, McClung & Stenzel, LLP

(57) ABSTRACT

An optical network terminal receives optical digital data that includes chirp. The optical network terminal processes the signal representative of the optical digital data from the optical network terminal in a manner determines changes in logic levels based upon temporary wavelength changes of the signal.

13 Claims, 8 Drawing Sheets

(56) References Cited

U.S. PATENT DOCUMENTS

2021/0359780 A1   11/2021   Guan
2023/0362521 A1*  11/2023   Colella .................. H04B 10/27

OTHER PUBLICATIONS

Zhang Feng et al: "Multiwavelength All-Optical Clock Recovery of Non-Return-to-Zero Data", Chinese Physics Letters, Institute of Physics Publishing, Bristol, GB, vol. 24, No. 4, Apr. 1, 2007, pp. 941-943, XP020113843, ISSN: 0256-307x, DOI: 10.1088/0256-307x/24/12/014 col. 1, line 30-line 32.

* cited by examiner

| Standard | Nominal Bitrate Downstream (Mbps) | Items | OLT Transmitter | Unit |
|---|---|---|---|---|
| APON/BPON | 155 | MLM Laser - maximum RMS width<br>SLM Laser - maximum - 20 dB<br>SLM Laser - minimum side-mode suppression ratio | 1.8<br>1.00<br>30.00 | nm<br>nm<br>dB |
| | 622 | MLM Laser - maximum RMS width<br>SLM Laser - maximum - 20 dB<br>SLM Laser - minimum side-mode suppression ratio | NA<br>1.00<br>30.00 | nm<br>nm<br>dB |
| | 1244 | MLM Laser - maximum RMS width<br>SLM Laser - maximum - 20 dB<br>SLM Laser - minimum side-mode suppression ratio | NA<br>1.00<br>30.00 | nm<br>nm<br>dB |
| GPON | 1244 | MLM Laser - maximum RMS width<br>SLM Laser - maximum - 20 dB<br>SLM Laser - minimum side-mode suppression ratio | NA<br>1.00<br>30.00 | nm<br>nm<br>dB |
| | 2488 | MLM Laser - maximum RMS width<br>SLM Laser - maximum - 20 dB<br>SLM Laser - minimum side-mode suppression ratio | NA<br>1<br>30 | nm<br>nm<br>dB |
| XGPON | 9953 | SLM Laser - maximum - 20 dB<br>SLM Laser - minimum side-mode suppression ratio | 1<br>30 | nm<br>dB |
| NG-PON2 | 9953 | SLM Laser - maximum - 20 dB<br>SLM Laser - minimum side-mode suppression ratio | 1<br>30 | nm<br>dB |

FIG. 5

| Standard | Nominal Bitrate Upstream (Mbps) | Items | ONT Transmitter | Unit |
|---|---|---|---|---|
| APON/BPON | 155 | MLM Laser -maximum RMS width<br>SLM Laser - maximum - 2 dB<br>SLM Laser - minimum side-mode suppression ratio | 5.8<br>1<br>30 | nm<br>nm<br>dB |
| | 622 | MLM Laser -maximum RMS width<br>SLM Laser - maximum - 20 dB<br>SLM Laser - minimum side-mode suppression ratio | 1.4/2.1/2.7<br>1<br>30 | nm<br>nm<br>dB |
| GPON | 155 | MLM Laser -maximum RMS width<br>SLM Laser - maximum - 20 dB<br>SLM Laser - minimum side-mode suppression ratio | 5.8<br>1<br>30 | nm<br>nm<br>dB |
| | 622 | MLM Laser -maximum RMS width<br>SLM Laser - maximum - 20 dB<br>SLM Laser - minimum side-mode suppression ratio | 1.4/2.1/2.7<br>1<br>30 | nm<br>nm<br>dB |
| | 1244 | MLM Laser -maximum RMS width<br>SLM Laser - maximum - 20 dB<br>SLM Laser - minimum side-mode suppression ratio | NA<br>1<br>30 | nm<br>nm<br>dB |
| | 2488 | MLM Laser -maximum RMS width<br>SLM Laser - maximum - 20 dB<br>SLM Laser - minimum side-mode suppression ratio | NA<br>1<br>30 | nm<br>nm<br>dB |
| XGPON | 2488 | SLM Laser - maximum - 20 dB<br>SLM Laser - minimum side-mode suppression ratio | 1<br>30 | nm<br>dB |

FIG. 5 (Continued)

SIGNAL SENSITIVITY FOR AN OPTICAL LINE TERMINAL

CROSS REFERENCE TO RELATED APPLICATIONS

This application claims priority to U.S. PCT application serial number PCT/US23/20069 filed Apr. 26, 2023 which claims the benefit of U.S. Provisional Patent Application Ser. No. 63/338,697 filed May 5, 2022.

BACKGROUND

The subject matter of this application relates to an optical line terminal.

A passive optical network (PON) is often employed as an access network, or a portion of a larger communication network. The communication network typically has a high-capacity core portion where data or other information associated with telephone calls, digital television, and Internet communications is carried substantial distances. The core portion may have the capability to interact with other networks to complete the transmission of telephone calls, digital television, and Internet communications. In this manner, the core portion in combination with the passive optical network enables communications to and communications from subscribers (or otherwise devices associated with a subscriber, customer, business, or otherwise).

The access network of the communication network extends from the core portion of the network to individual subscribers, such as those associated with a particular residence location (e.g., business location). The access network may be wireless access, such as a cellular network, or a fixed access, such as a passive optical network or a cable network.

Referring to FIG. 1, in a PON 10, a set of optical fibres and passive interconnecting devices are used for most or all of the communications through the extent of the access network. A set of one or more optical network terminals (ONTs) 11 are devices that are typically positioned at a subscriber's residence location (e.g., or business location). The term "ONT" includes what is also referred to as an optical network unit (ONU). There may be any number of ONTs associated with a single optical splitter 12. By way of example, 32 or 64 ONTs are often associated with the single network optical splitter 12. The optical splitter 12 is interconnected with the respective ONTs 11 by a respective optical fiber 13, or otherwise a respective fiber within an optical fiber cable. Selected ONTs may be removed and/or added to the access network associated with the optical splitter 12, as desired. There may be multiple optical splitters 12 that are arranged in a cascaded arrangement.

The optical fibers 13 interconnecting the optical splitter 12 and the ONTs 11 act as access (or "drop") fibers. The optical splitter 12 is typically located in a street cabinet or other structure where one or more optical splitters 12 are located, each of which are serving their respective set of ONTs. In some cases, an ONT may service a plurality of subscribers, such as those within a multiple dwelling unit (e.g., apartment building). In this manner, the PON may be considered a point to multipoint topology in which a single optical fiber serves multiple endpoints by using passive fiber optic splitters to divide the fiber bandwidth among the endpoints.

An optical line terminal (OLT) 14 is located at the central office where it interfaces directly or indirectly with a core network 15. An interface 16 between the OLT 14 and the core network 15 may be one or more optical fibers, or any other type of communication medium. The OLT 14 forms optical signals for transmission downstream to the ONTs 11 through a feeder optical fiber 17, and receives optical signals from the ONTs 11 through the feeder optical fiber 17. The optical splitter 12 is typically a passive device that distributes the signal received from the OLT 14 to the ONTs 11. Similarly, the optical splitter 12 receives optical signals from the ONTs 11 and provides the optical signals though the feeder optical fiber 17 to the OLT 14. In this manner, the PON includes an OLT with a plurality of ONTs, which reduces the amount of fiber necessary as compared with a point-to-point architecture.

As it may be observed, an optical signal is provided to the feeder fiber 17 that includes all of the data for the ONTs 11. Accordingly, all the data being provided to each of the ONTs is provided to all the ONTs through the optical splitter 12. Each of the ONTs selects the portions of the received optical signals that are intended for that particular ONT and passes the data along to the subscriber, while discarding the remaining data. Typically, the data to the ONTs are broadcast to the feeder fiber 17 and provided to each of the ONTs.

Upstream transmissions from the ONTs 11 through the respective optical fibers 13 are typically transmitted in bursts according to a schedule provided to each ONT by the OLT. In this way, each of the ONTs 11 will transmit upstream optical data at different times. In some embodiments, the upstream and downstream transmissions are transmitted using different wavelengths of light so that they do not interfere with one another. In this manner, the PON may take advantage of wavelength-division multiplexing, using one wavelength for downstream traffic and another wavelength for upstream traffic on a single mode fiber.

The schedule from the OLT allocates upstream bandwidth to the ONTs. Since the optical distribution network is shared, the ONT upstream transmission would likely collide if they were transmitted at random times. The ONTs typically lie at varying distances from the OLT and/or the optical splitter, resulting in a different transmission delay from each ONT. The OLT measures the delay and sets a register in each ONT to equalize its delay with respect to the other ONTs associated with the OLT. Once the delays have been accounted for, the OLT transmits so-called grants in the form of grant maps to the individual ONTs. A grant map is a permission to use a defined interval of time for upstream transmission. The grant map is dynamically recalculated periodically, such as for each frame. The grant map allocates bandwidth to all the ONTs, such that each ONT receives timely bandwidth allocation for its service needs. Much of the data traffic, such as browsing websites, tends to have bursts and tends to be highly variable over time. By way of a dynamic bandwidth allocation (DBA) among the different ONTs, a PON can be oversubscribed for upstream traffic.

BRIEF DESCRIPTION OF THE DRAWINGS

For a better understanding of the invention, and to show how the same may be carried into effect, reference will now be made, by way of example, to the accompanying drawings, in which:

FIG. 5 illustrates a table of laser requirements.

DETAILED DESCRIPTION

The passive optical network generally consists of three main parts, (1) an optical line terminal (OLT) that is an interface between an Internet Service Provider (ISP)/Core Network and an access network, (2) an optical network terminal that is an interface between optical and 'metallic' networks, such as the devices of the subscriber's residence, and (3) an optical distribution network (ODN) that provides an optical link between the OLT and the ONT. There are a number of different PON standards that are used for communication using the PON network. For example, asynchronous transfer mode PON (APON) is described in International Telecommunication Union Telecommunication sector (ITU-T) G.983 in 1998. For example, Broadband PON (BPON) is described in International Telecommunication Union Telecommunication sector (ITU-T) G.983.1 in 2000, where BPON includes wavelength multiplex for the separation of downstream and upstream. For example, Gigabit PON (GPON) is described in International Telecommunication Union Telecommunication sector (ITU-T) G.984 in 2003, where GPON includes an extended bitrate with respect to APON/BPON. For example, Next-Generation PON (XG-PON) is described in International Telecommunication Union Telecommunication sector (ITU-T) G.987 in 2010, where XG-PON includes a further extended bitrate with respect to GPON. For example, Ethernet PON (EPON) is described in Institute of Electrical and Electronics Engineers (IEEE) as IEEE 802.3ah in 2004. For example, 10GEPON is described in Institute of Electrical and Electronics Engineers (IEEE) as IEEE 802.3av in 2009. For example, Next-Generation PON stage 2 (NG-PON2) is described in International Telecommunication Union Telecommunication sector (ITU-T) G.989 in 2005. For example, Wavelength Divisional Multiplex PON (WDM-PON) was introduced in 2010. Each of the standards, and WDM-PON, described above is incorporated by reference herein in its entirety. Except for WDM-PON which uses wavelength division multiplexing, all the PONs are based on time division multiplexing (TDM), while NG-PON2 combines both TDM and WDM.

Figure 1:
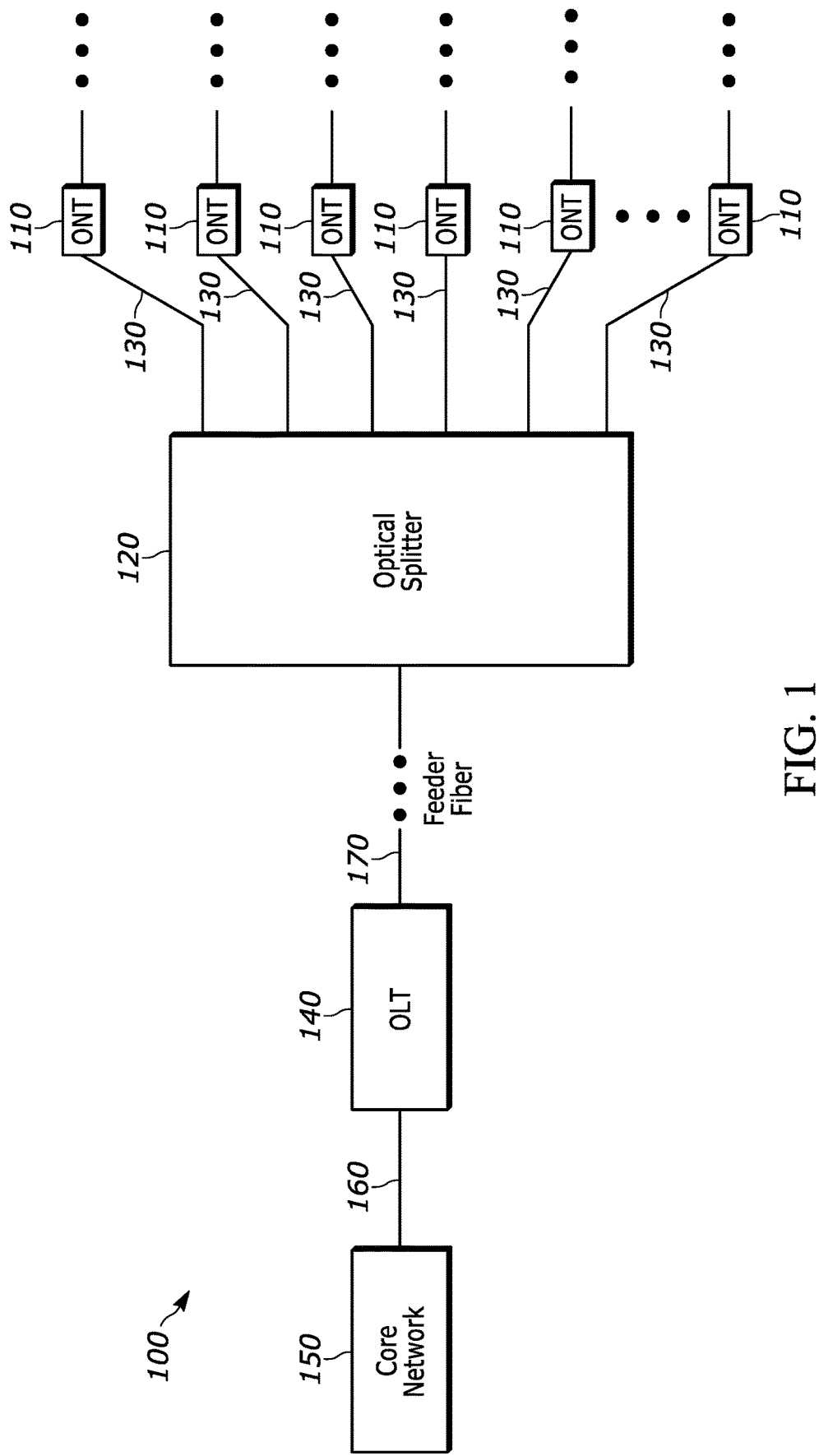
FIG. 1 illustrates a network that includes a passive optical network.
Figure 2:
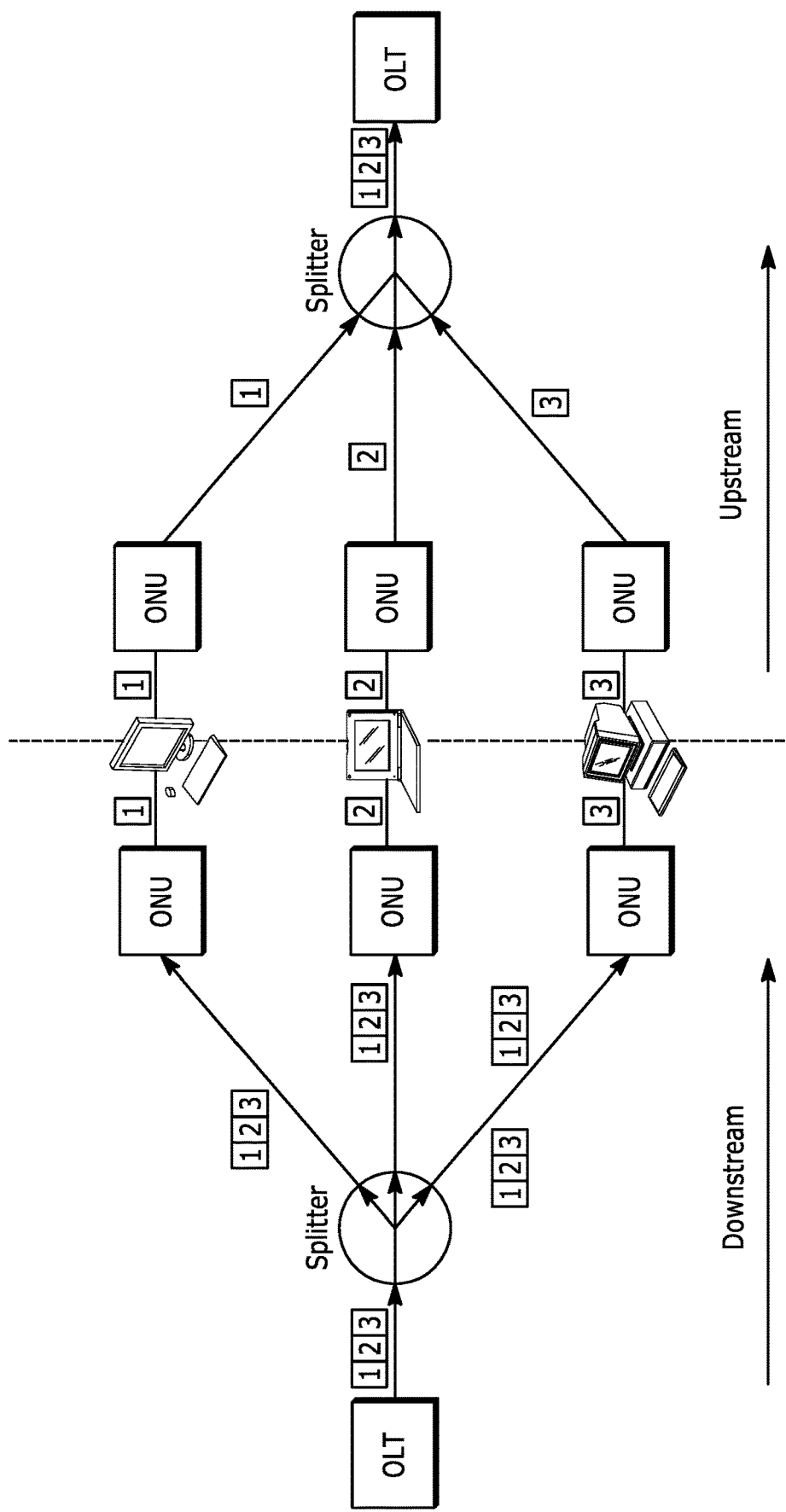
FIG. 2 illustrates a TDM based PON.

Referring to FIG. 2, for a TDM based PON the system divides the capacity into time slots, which are assigned to end users (downstream). Recognition of the beginning and end of each time slot is achieved by using additional headers for each frame. If the time slots have the same length, it is possible to synchronize the multiplexer and demultiplexer using a synchronization interval. Downstream, a set of one or more distributed feedback lasers in the OLT are directly modulated by a control system. Upstream, each data stream from the end users is stacked into defined time intervals, which form the final data stream towards the OLT. To avoid mutual collisions, the OLT transmits information downstream (based on the knowledge of the delay caused by signal spreading from each of the ONTs) with a transmitting time allocated for each ONT. At this allocated time, the ONT guarantees that no other ONT will transmit at the same time on the same frequency. The upstream mode may also be referred to as a "burst" due to the allocated time slots in which the ONT transmits the signal. The OLT receives the digital optical data at a connector, which may have any suitable configuration, including one or more ports, one or more physical connectors, or otherwise directly integrated with one or more optical fibers.

Preferably semiconductor-based lasers are used as the light sources for the data transmission, since they are readily integrated into the OLT and the ONT. Coherent light emission is produced by such lasers by stimulated emission, where the gain is achieved in the active medium of the semiconductor by electrical injection. Typically, a single longitudinal mode (SLM) laser, such as a distributed feedback (DFB) laser, (e.g., a single longitudinal mode laser with distributed negative feedback) or a multi-longitudinal mode (MLM) laser, such as a Fabry-Pérot are used.

Figure 3:
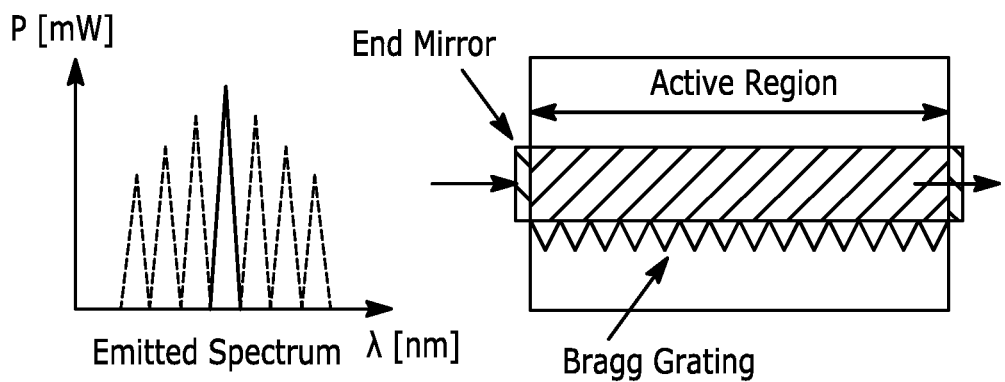
FIG. 3 illustrates a DFM laser.

Referring to FIG. 3, the distributed feedback laser includes a resonator that consists of a periodic structure, which acts as a distributed reflector in the wavelength range of the laser action, and contains a gain medium. Often, the periodic structure is made with a phase shift in its middle. This structure provides the direct concatenation of two Bragg gratings with optical gain within the gratings. The device may have multiple axial resonator modes, but there is typically one mode which is has substantially less loss. Therefore, single-frequency operation is often achieved, despite spatial hole burning due to the standing-wave pattern in the gain medium. Due to the large free spectral range, wavelength tuning without mode hops may be achieved.

Typically distributed-feedback lasers are either fiber lasers or semiconductor lasers, operating in a single resonator mode. In the case of a fiber laser, the distributed reflection occurs in a fiber Bragg grating. Efficient pump absorption may be achieved with a high doping concentration of the fiber with Bragg gratings in the fibers. Such distributed-feedback lasers tend to be compact and robust with a low intensity and phase noise level.

Semiconductor distributed-feedback lasers may include an integrated grating structure, e.g., a corrugated waveguide. The grating structure may be produced on top of the active region or laterally coupled structures, where the gratings are on both sides of the active region. Semiconductor distributed-feedback lasers are available for emission in different spectral regions, at least in the range from 800 to 2800 nm. Typical output powers are tens of milliwatts. The line width is typically a few hundred MHz, and wavelength tuning is possible.

Figure 4:
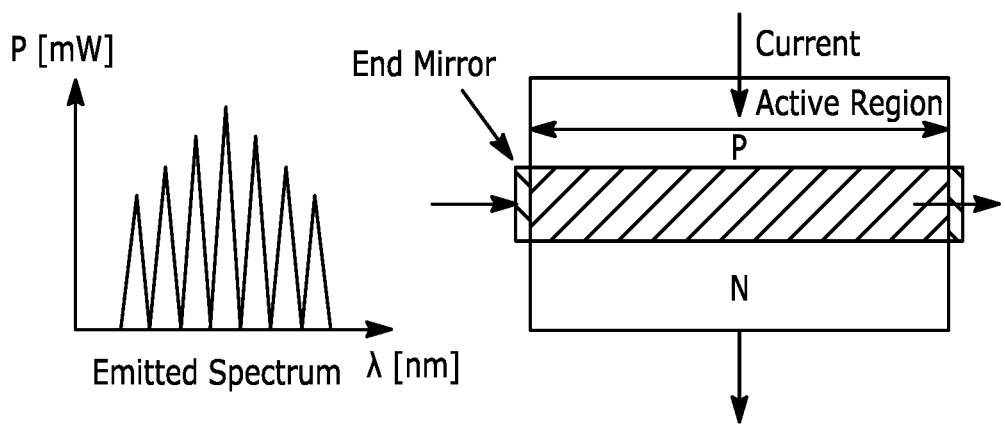
FIG. 4 illustrates a Fabry-Pérot laser.

Referring to FIG. 4, in Fabry-Pérot lasers, optical feedback is achieved by the cleaved facets of the diode, which causes the laser action to occur. This results in Fabry-Pérot lasers as edge-emitting diode lasers. The emission is produced at the longitudinal modes of the cavity and can be tuned by tuning the cavity length. A laser oscillator has two mirrors separated by an amplifying medium with an inverted population, making a Fabry-Pérot cavity. Fabry-Pérot lasers may use a single mode or multimode output and internal modulation.

A Fabry-Pérot cavity is a cavity with two reflecting mirrors (i.e., either flat or curved) that bounce light back and forth, forming a standing wave. Fabry-Pérot lasers are made with a gain region and a pair of mirrors on the facets, with wavelength selectivity from the wavelength dependence of the gain and an integral number of wavelengths in a cavity round trip.

Referring to FIG. 5, a table of the laser requirements for various standards are tabulated, for the MLM laser and the SLM laser.

Figure 6A:
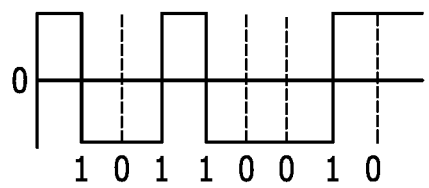
FIG. 6 illustrates non-return to zero signalling.
Figure 6B:
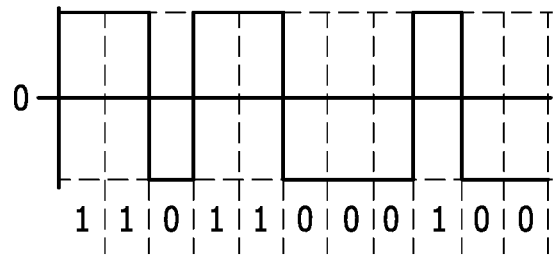

Referring to FIG. 6A and FIG. 6B, the laser in PON systems typically use a direction modulation of the base baseband using a non-return to zero modulation technique in both the upstream and the downstream directions. Non-return to zero modulation is a binary code in which ones are represented by one condition, usually a higher value, while zeros are represented by another condition, usually a lower value. As it may be observed, non-return to zero has no neutral state. Typically, a logic "1" is represented by a higher current level resulting in a higher output power level, while a logic "0" is represented by a lower current level resulting in a lower output power level. The OLT and ONT typically include a respective light sensitive detector, such as a photodiode. The photodiode is a semiconductor p-n junction device that converts light into an electrical current. The current is generated when photons are absorbed in the photodiode. Photodiodes may contain optical filters, built-in lenses, and varying surface areas. Typically, photodiodes have a slower response time as their surface area increases. The photodiode device may, for example, include a wide, undoped intrinsic semiconductor region between a p-type semiconductor region and an n-type semiconductor region. The photodiode device may, for example, include an avalanche photodiode. Consequently, the ability to distinguish between a logic "0" and a logic "1" is based on the signal power of the output signal versus the noise floor of the system.

A PON link budget may be defined as the maximum optical loss that the system can readily tolerate while still providing reasonably error free data links. The data links may have some relatively low levels of losses, which are often corrected by using a forward error correction code. Often a PON system may support 28 db of loss in the data links while still having sufficiently error free operation. The PON link budget is typically dependent upon several factors. A first factor is the transmission power level of the OLT or the ONT. A second factor is the responsivity of the light sensitive detector (e.g., photodiode), which if often measured in amps per watt. A third factor is the bandwidth of the system. When the bandwidth of the system is lower, the system can run at higher power levels and the light sensitive detector typically has larger geometry (e.g., the light sensitive detector is slower but provides more amps per watt).

The factors for the PON link budget may be modified to provide a greater link budget, but this is limited based upon what may be achieved in a practical implementation, such as a thermal noise floor, and shock noise that limits the ability to transmit at higher power levels. Accordingly, the ability for increasing the upstream transmission power or increasing the downstream sensitivity is based upon limitations that may not be suitable for a practical implementation.

As previously described, the laser may be considered to be an optical oscillator where the amplitude of the output signal is dependent on the current level being applied, and where its nominal wavelength is dependent on the physical characteristics of the laser's cavity and the constituent chemistry of the laser. A typically undesirable side effect of directly modulating a laser between logic levels is that in addition to varying the output power intensity, the laser wavelength also temporarily changes. The temporary wavelength changes as a result of changes in the logic levels may be generally referred to as "chirp". In part, the basis for the chirp is that the system is changing the heat of the device, which increases and decreases the laser cavity size, resulting in the modulation. This chirp is traditionally considered to limit the performance of long distance optical systems, such as a PON, because the different wavelengths travel at different speeds through the optical fiber and as a result the eye diagrams tend to close in on one another. Accordingly, the ONT does not encode any of the data at different wavelengths, but rather encodes the data based on signal strength (e.g., amplitudes). A traditional light sensitive device at the OLT typically includes an optical filter that removes a substantial portion of the undesirable "chirp" and the resulting optical signal is sensed using the amplitude sensitive nature of the light sensitive device which does not discriminate based upon wavelength. In other words, the different wavelengths of the optical signal are not used, other than the energy contained therein, to determine the signalling of the optical signal.

In the downstream direction, the transmission power of the laser is typically increased, for example by using an erbium doped fiber amplifier, to sufficiently increase the signal at the set of corresponding ONTs, which is a burden shared by the OLT across a substantial set of ONTs. In the upstream direction, the transmission power of the laser is not typically increased, for example by using an erbium doped fiber amplifier, because of packaging constraints and the burden is not shared by the ONT with other ONTs on the PON network.

Figure 7:
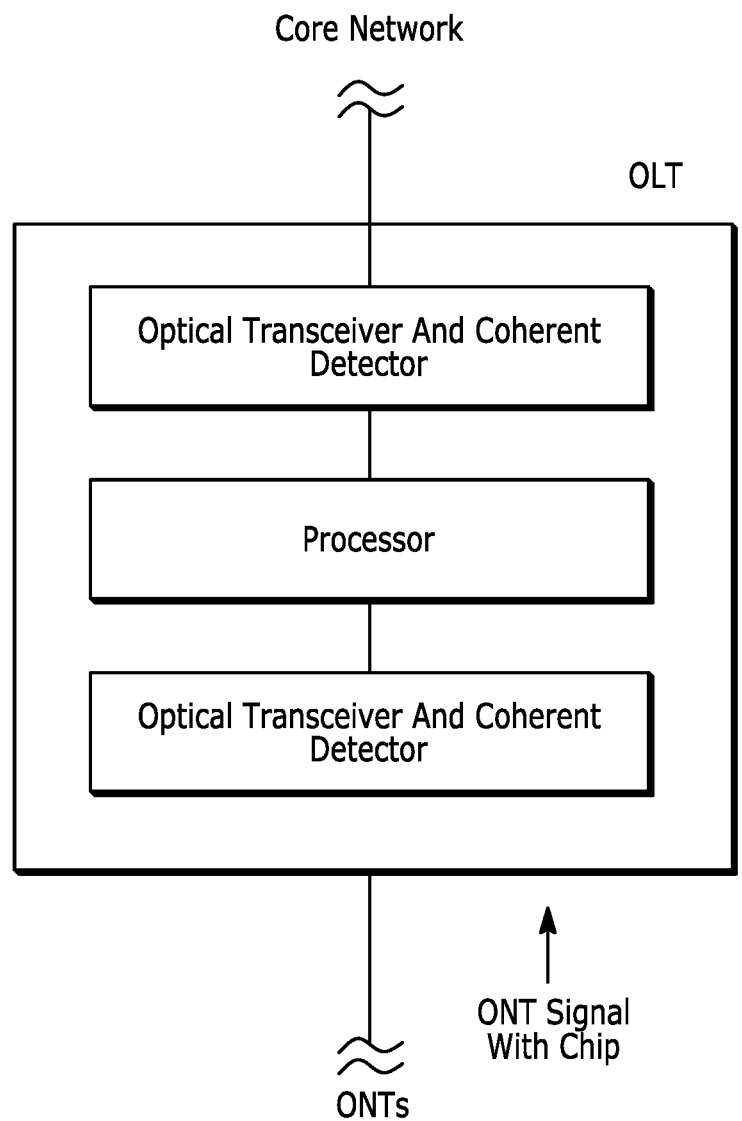
FIG. 7 illustrates an OLT with a coherent detector.

Referring to FIG. 7, it was determined that in fact for the OLT the wavelengths of the "chirp" for the ONTs, rather than being an undesirable characteristic in the optical signal, may be used together with non-return to zero modulation to assist in the discrimination between the different logical states. One manner of detecting the "chirp" is to use a coherent optical detector, where the receiver determines decisions based on the recovery of the full electric field, which contains both amplitude information and phase information. The coherent detector may include a local oscillator, a delay line, a phase locked loop, and/or otherwise, that serves as a phase reference, if desired. The OLT also includes one or more transceivers to receive and send suitable signals to the core network and the ONTs.

Figure 8:
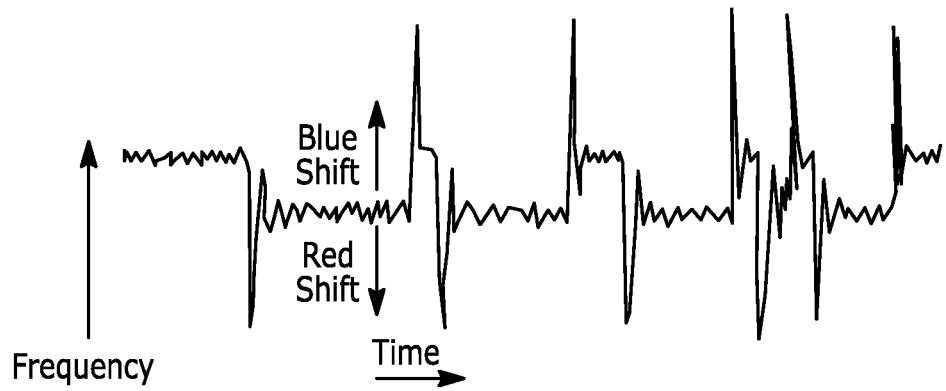
FIG. 8 illustrates optical signals with a chirp.

Referring to FIG. 8, an illustrative signal is shown of the wavelengths provided to a coherent optical detector of the OLT. The coherent detector of the OLT distinguishes between the transitions that occur between the different non-return to zero logical levels. The coherent optical detector may include any suitable detector, such as one that includes a Mach-Zehnder modulator. In particular, those portions of the detected signal that include sufficient blue shift and/or red shift, which coincide with the "chirp", indicate a transition between logical states of the non-return to zero detector.

Figure 9:
FIG. 9 illustrates magnitudes of optical signals.

Referring to FIG. 9, an illustrative signal is shown of the signal magnitude provided to the coherent optical detector, which may further include amplitude detection. In this manner, the coherent detector inclusive of the amplitude detection would be able to further distinguish the transitions that occur between the non-return to zero logical levels. In particular, those portions of the detected signal that include sufficient amplitude change, which coincide with the "chirp", indicate a transition between logical states of the non-return to zero detector.

Figure 10:
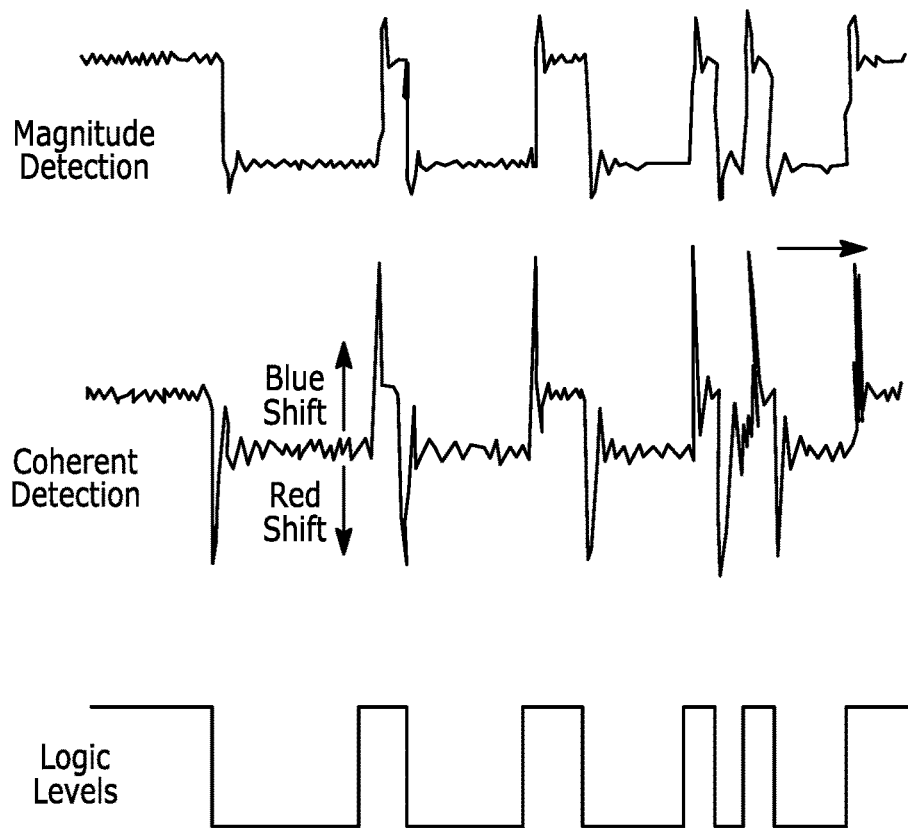
FIG. 10 illustrates logic levels of FIG. 8 and FIG. 9.

Referring to FIG. 10, based upon analysis of the signals resulting from the coherent portion of the detection (FIG. 8) together with the amplitude detection (FIG. 9) the OLT determines the changes between the logic levels. For example, this may be based upon peak detector or other suitable signal analysis for either the coherent portion of the detection, or the combination of the coherent portion of the detection together with the amplitude detection. There may be multiple bits of "0"'s or "1" s while the signal is maintained for a period of time at a particular state. A processor, such as a digital signal processor, within the OLT may be used to do the processing of the coherent detection, together with the amplitude detection, as desired. By using this modified structure the sensitivity may be increased from around 28 db to around 70 db with the same noise levels.

Figure 11:
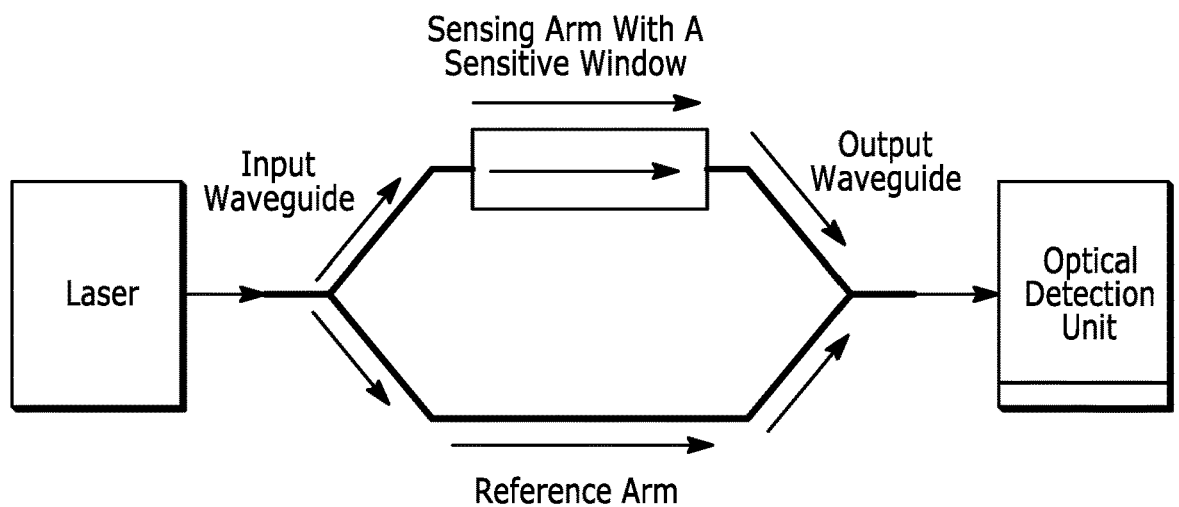
FIG. 11 illustrates a MZM device.

Referring to FIG. 11, an exemplary Mach Zehnder modulator is illustrated. The Mach-Zehnder modulator (MZM) is an interferometric structure made from a material with a strong electro-optic effect (e.g., LiNbO3, GaAs, InP). By applying electric fields to the arms changes optical path lengths resulting in phase modulation. Combining two arms with different phase modulation converts phase modulation into intensity modulation, which may be subsequently processed by a digital processor.

An exemplary implementation of a detector for the OLT that is sensitive to the signals that include the "chirp" may include an optical phase locked loop that is applied to both a local oscillator and the received signal applied to the local detector where the output is the sum and the difference of the two signal's waveforms. The local oscillator is varied in frequency through a feedback scheme such that the difference signal at the output of the detector is nulled to zero, namely, the case where the two oscillators are operating at the same wavelength. Variations in the feedback control signal to the local oscillator is a function of any frequency modulation or "chirp" carried in the incoming optical signal, which results in the demodulated signal.

In this implementation, in addition to the local oscillator, the detector may include associated passive optical components such as beam splitter, and a feedback system. The feedback system may be implemented in any suitable manner, such as using the processor for programmable and adaptive feedback.

The nominal operating wavelength of the upstream laser tends to vary from unit to unit based on manufacturing variations and the temperature of the laser. To improve the "lock-in" time between receiving data from different ONTs, it is desirable to "pre-lock" the phase lock loop local oscillator (e.g., laser) for the expected incoming signal. One technique of achieving the "pre-lock" is to save the mean value (or other value) of the phase lock look local oscillator control signal for each ONT. In this manner, when the ONT is granted transmission permission, the local oscillator is "pre-locked" by applying a suitable control signal to put the local oscillator on frequency.

Additional sensitivity may be attained by reducing the applied modulation depth to the upstream laser. If higher average receive powers are available by not operating the laser at range closer to extinction, then the system sensitivity improves. The system would then rely on detecting the chirp in the upstream signal.

Some noise reduction in the system may be achieved by using a limiting optical amplifier together with the local oscillator. This reduces the noise because the local oscillator (e.g . . . , laser) will also be changing in output amplitude as it tracks the incoming signal's wavelength. Another variation would be to modify the phase locked loop to an amplitude locked loop, where the detected modulation is used as the control signal to maintain a constant amplitude level from the detector.

Some further noise reduction in the system may be achieved by using a balanced detector, since the various in levels would be common mode signals that would be mostly rejected in a balanced detection system. For example, two detectors may be connected in anti-series. For example, a post-detector amplifiers may be connected in a manner to cancel the common mode noise.

Moreover, each functional block or various features in each of the aforementioned embodiments may be implemented or executed by a circuitry, which is typically an integrated circuit or a plurality of integrated circuits. The circuitry designed to execute the functions described in the present specification may comprise a general-purpose processor, a digital signal processor (DSP), an application specific or general application integrated circuit (ASIC), a field programmable gate array (FPGA), or other programmable logic devices, discrete gates or transistor logic, or a discrete hardware component, or a combination thereof. The general-purpose processor may be a microprocessor, or alternatively, the processor may be a conventional processor, a controller, a microcontroller or a state machine. The general-purpose processor or each circuit described above may be configured by a digital circuit or may be configured by an analogue circuit. Further, when a technology of making into an integrated circuit superseding integrated circuits at the present time appears due to advancement of a semiconductor technology, the integrated circuit by this technology is also able to be used.

It will be appreciated that the invention is not restricted to the particular embodiment that has been described, and that variations may be made therein without departing from the scope of the invention as defined in the appended claims, as interpreted in accordance with principles of prevailing law, including the doctrine of equivalents or any other principle that enlarges the enforceable scope of a claim beyond its literal scope. Unless the context indicates otherwise, a reference in a claim to the number of instances of an element, be it a reference to one instance or more than one instance, requires at least the stated number of instances of the element but is not intended to exclude from the scope of the claim a structure or method having more instances of that element than stated. The word "comprise" or a derivative thereof, when used in a claim, is used in a nonexclusive sense that is not intended to exclude the presence of other elements or steps in a claimed structure or method.

The invention claimed is:

1. An optical network terminal including a processor comprising:
    (a) said optical line terminal capable of receiving digital data from a core network from a first connection and provide optical digital data representative of said digital data from said core network to an optical network terminal though an optical fiber connection associated with said optical line terminal;
    (b) said optical line terminal capable of receiving optical digital data from said optical network terminal through said optical fiber connection associated with said optical line terminal and provide digital data representative of said optical digital data from said optical network terminal to a core network;
    (c) said optical digital data from said optical network terminal including chirp, wherein said chirp includes temporary wavelength changes of a signal representative of said optical digital data as a result of changes in logic levels of said signal, wherein said logic levels are based upon a non-return to zero modulation;
    (d) said optical line terminal processing said signal representative of said optical digital data from said optical network terminal in a manner determines changes in said logic levels based upon said temporary wavelength changes of said signal.

2. The optical line terminal of claim 1 wherein said optical digital data from said optical network terminal is sensed by a light sensitive detector.

3. The optical line terminal of claim 2 wherein said light sensitive detector includes an optical phase locked loop applied to both a local oscillator and said signal.

4. The optical line terminal of claim 3 wherein said optical phase locked loop includes a passive optical component.

5. The optical line terminal of claim 2 wherein said light sensitive detector includes pre-locking an oscillator of a phase lock loop.

6. The optical line terminal of claim 5 wherein said pre-locking is based upon a stored value of a previous signal.

7. The optical line terminal of claim 2 wherein said light sensitive detector comprises two detectors arranged in an anti-series configuration.

8. The optical line terminal of claim 1 further comprising said optical line terminal processing said signal representative of said optical digital data from said optical network terminal in a manner determines changes in said logic levels based upon power level changes in said signal.

9. The optical line terminal of claim 1 further determining said changes in said logic levels based upon both said determining changes in said logic levels based upon said temporary wavelength changes of said signal and determining changes in said logic levels based upon power level changes in said signal.

10. The optical line terminal of claim 1 wherein said optical digital data from said optical network terminal is provided by a SLM based laser.

11. The optical line terminal of claim 10 wherein said SLM based laser is a distributed feedback based laser.

12. The optical line terminal of claim 10 wherein said MLM based laser is a Fabry-Pérot based laser.

13. The optical line terminal of claim 1 wherein said optical digital data from said optical network terminal is provided by a MLM based laser.

* * * * *